US011615233B2

(12) United States Patent
Allen et al.

(10) Patent No.: US 11,615,233 B2
(45) Date of Patent: Mar. 28, 2023

(54) SEMANTIC SLIDE AUTOLAYOUTS

(71) Applicant: WETRANSFER B.V., Amsterdam (NL)

(72) Inventors: Andrew Scott Allen, Seattle, WA (US); Kyung Jin Chun, Brooklyn, NY (US); Eric Steven Rockey, Brooklyn, NY (US)

(73) Assignee: WETRANSFER B.V., Amsterdam (NL)

( * ) Notice: Subject to any disclaimer, the term of this patent is extended or adjusted under 35 U.S.C. 154(b) by 0 days.

(21) Appl. No.: 16/650,808

(22) PCT Filed: Nov. 13, 2018

(86) PCT No.: PCT/IB2018/001426
§ 371 (c)(1),
(2) Date: Mar. 25, 2020

(87) PCT Pub. No.: WO2019/092506
PCT Pub. Date: May 16, 2019

(65) Prior Publication Data
US 2020/0242298 A1    Jul. 30, 2020

Related U.S. Application Data

(60) Provisional application No. 62/585,372, filed on Nov. 13, 2017.

(51) Int. Cl.
*G06F 40/166*    (2020.01)
*G06F 40/103*    (2020.01)

(52) U.S. Cl.
CPC ......... *G06F 40/166* (2020.01); *G06F 40/103* (2020.01)

(58) Field of Classification Search
CPC .. G06F 40/166; G06F 40/103; G06F 16/4393; G06F 40/189; G06F 40/10; G06F 40/186
See application file for complete search history.

(56) References Cited

U.S. PATENT DOCUMENTS 10,049,477 B1 * 8/2018 Kokemohr .............. G06T 11/60
2004/0183830 A1 * 9/2004 Cody ................... G06Q 10/107
715/747

(Continued)

OTHER PUBLICATIONS

PCT/IB2018/001426, International Search Report and Written Opinion, 13 pages, dated Feb. 22, 2019.

(Continued)

*Primary Examiner* — Kieu D Vu
*Assistant Examiner* — Rami R Okasha
(74) *Attorney, Agent, or Firm* — Stoel Rives LLP

(57) ABSTRACT

Computer-readable media and related methods for semantic slide autolayouts are disclosed. A processor is configured to display a default layout of a presentation slide within a graphical user interface (GUI). The default layout includes a text field and an asset field. The text field is configured to receive text to be displayed in the presentation slide, and the asset field is configured to receive digital assets to be displayed in the presentation slide. The processor is also configured to automatically determine an intent to emphasize the text or the digital assets within the presentation slide, and automatically reformat the presentation slide to emphasize the text or the digital assets based on the determined intent.

17 Claims, 13 Drawing Sheets

(56) References Cited

U.S. PATENT DOCUMENTS

| | | | |
|---|---|---|---|
| 2006/0282779 A1* | 12/2006 | Collins | G06F 16/4393 |
| | | | 715/732 |
| 2007/0294238 A1* | 12/2007 | Citron | G06F 40/186 |
| 2008/0313533 A1* | 12/2008 | Hoyer | G06F 40/103 |
| | | | 715/243 |
| 2010/0313107 A1* | 12/2010 | Hikida | G06F 40/106 |
| | | | 715/202 |
| 2012/0204100 A1* | 8/2012 | Damera-Venkata | |
| | | | G06F 40/103 |
| | | | 715/244 |
| 2012/0278704 A1* | 11/2012 | Ying | G06F 40/166 |
| | | | 715/243 |
| 2013/0254655 A1* | 9/2013 | Nykyforov | G06F 40/103 |
| | | | 715/244 |
| 2014/0071168 A1* | 3/2014 | Berglund | G06T 3/40 |
| | | | 345/660 |
| 2014/0181646 A1* | 6/2014 | Rangwala | G06F 16/345 |
| | | | 715/252 |
| 2015/0052439 A1* | 2/2015 | Pasquarette | G06F 3/04845 |
| | | | 715/731 |
| 2015/0309683 A1* | 10/2015 | Ying | G06F 3/0484 |
| | | | 715/780 |
| 2016/0092091 A1* | 3/2016 | Hanson | G06F 40/106 |
| | | | 715/763 |
| 2016/0092405 A1* | 3/2016 | Lee | G06F 40/106 |
| | | | 715/202 |
| 2016/0092428 A1* | 3/2016 | Ilic | G06F 40/131 |
| | | | 715/765 |
| 2017/0308518 A1* | 10/2017 | Sjolander | G06F 40/186 |
| 2018/0081861 A1* | 3/2018 | Danielyan | G06F 40/169 |
| 2018/0232340 A1* | 8/2018 | Lee | G06F 40/186 |
| 2018/0276182 A1* | 9/2018 | O'Donovan | G06F 8/34 |
| 2019/0004686 A1* | 1/2019 | Hamlin | G06F 3/04845 |
| 2019/0073350 A1* | 3/2019 | Shiotani | G06F 3/1243 |

OTHER PUBLICATIONS

Weverka, Peter, "PowerPoint 2007 All-In-One Desk Reference for Dummies", Wiley Publishing, 96 pages, 2007.

Weverka, "PowerPoint 2007 All-In-One Desl Reference for Dummies", Wiley Publishing, Inc., 2007, 96 pages.

\* cited by examiner

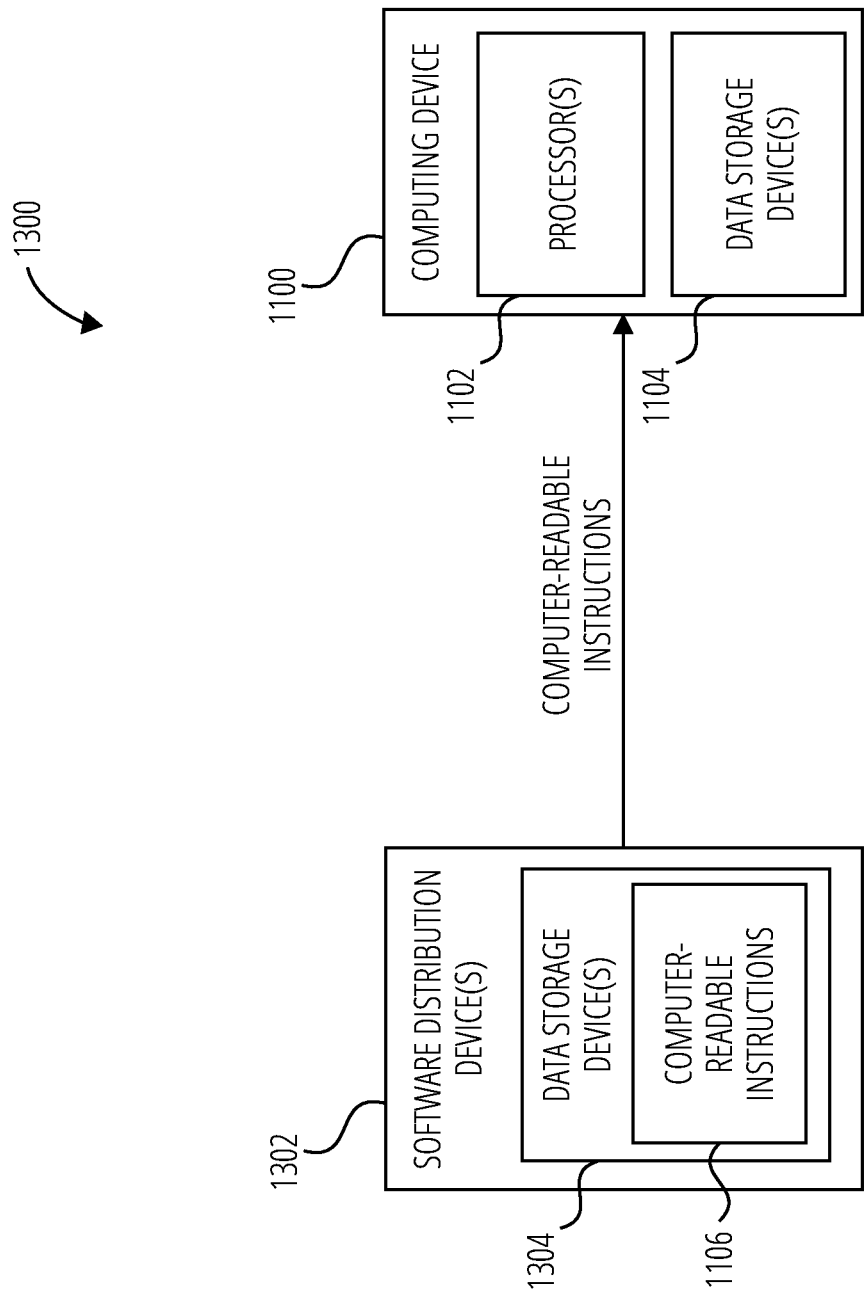

SEMANTIC SLIDE AUTOLAYOUTS

CROSS-REFERENCE TO RELATED APPLICATIONS

This application claims priority to U.S. Provisional Patent Application No. 62/585,372, filed Nov. 13, 2017, and titled "SEMANTIC SLIDE AUTOLAYOUTS," the entire disclosure of which is hereby incorporated herein in its entirety.

BACKGROUND

Presentation software enables the production of slides to assist in presenting information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 13 is a block diagram of a software distribution system, according to some embodiments.

DETAILED DESCRIPTION

Description

Figure 1:
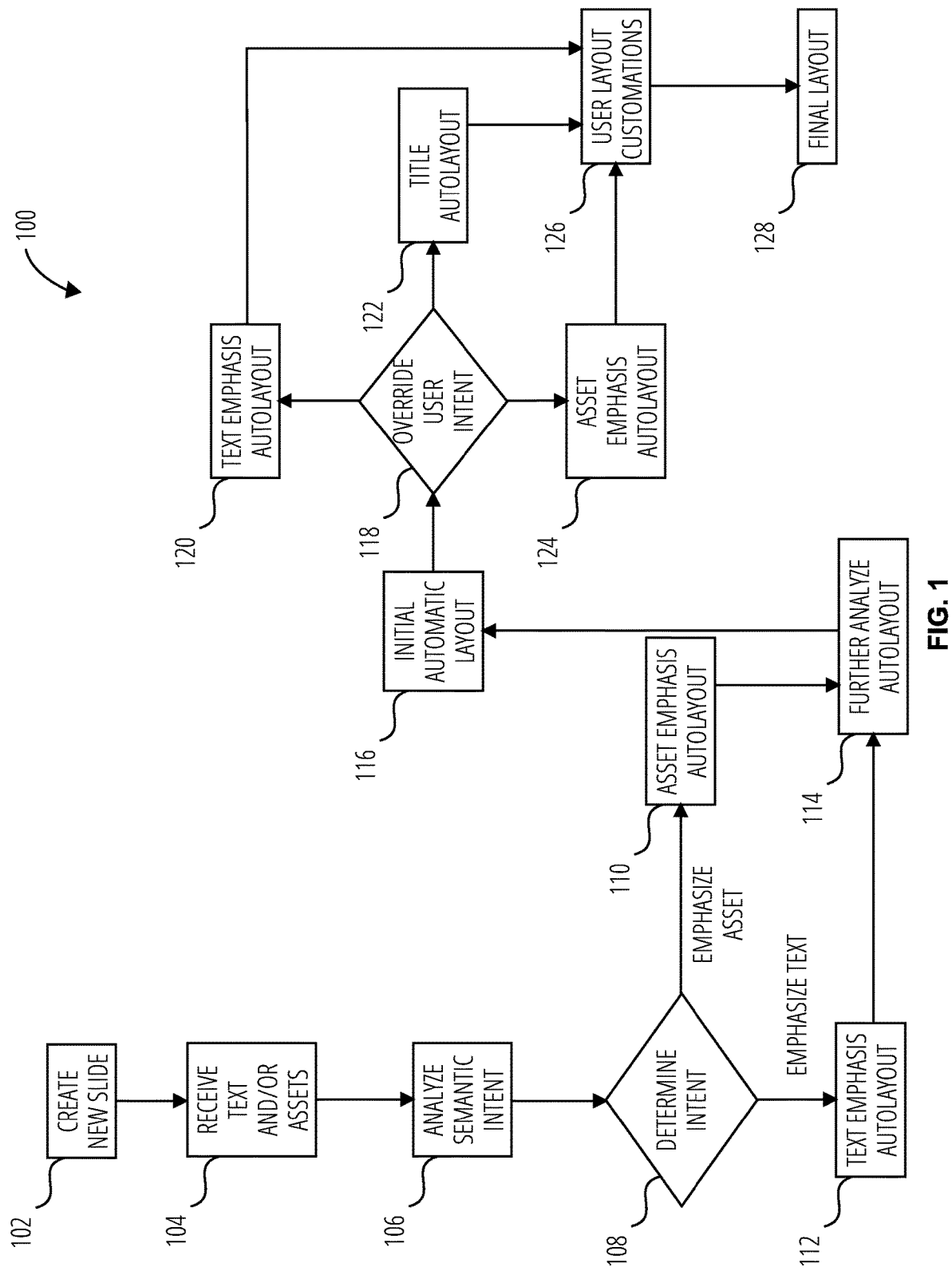
FIG. 1 is a flowchart illustrating a method 100 of performing semantic auto layout of a presentation slide in a slideshow presentation software program, according to some embodiments.

Slides in presentation software may rely on users to make many time consuming manual layout adjustments such as moving text blocks on a page, making size adjustments, or formatting illustrations. These steps may be repeated to adjust a presentation slide for different screen sizes such as a mobile phone, TV, or tablet. Disclosed herein are Semantic Slide Autolayouts that automatically handle time-consuming layout task for users to enable the users to focus on the meaning of the presentation and the information they are trying to convey.

When designing slides using presentation software, the user often has an intent for what type of information a slide is to communicate, but does not possess the design skills to create an effective slide from scratch. Examples of such intents can include:

conveying a title of a presentation or of a section of the presentation;

conveying information through text, with images or other assets as illustration; and conveying information through images or other assets, with some text as a caption.

The creation of specific template slides for each of these example intents (i.e. title slides, text-focused slides, asset-focused slides) is a brittle solution to this problem. For one thing, these templates do not adjust as the user adds additional content (e.g., additional assets or longer versions of text). For example, a template may accommodate space for a single asset but have no provisions for multiple assets to be added, requiring manual re-layout of the slide, which may result in sub-optimal results. In addition, templates are typically not flexible to different types of content and do not adjust to changes in asset aspect ratio, text length, etc.

Another way to approach this problem may be through suggested layouts that analyze the content on a slide and then suggest a series of possible layouts to accommodate the content. These solutions require the user to choose from an extensive list, and do not include any way to indicate the user's communication intent for the slide.

Embodiments disclosed herein allow the user to express an intent for communication of a slide. For example, the user may be presented a choice from three options: "Show", "Tell" or "Intro", and from this information automatically layout the slide in an effective manner. Embodiments disclosed herein produce a great-looking and fully usable slide by default, which can also be further customized in ways that are not brittle. This customization can continue to accommodate changing content, including changes in various asset aspect ratios, changes in text lengths, and changes in numbers of assets.

Systems and methods according to some embodiments of the disclosure may include at least some of the following features:

semantically indicating the communication intent for a slide while relying on automatic layout methods to produce the final slide layout;

inferring default layout semantics from content added to the slide and the order it was added;

responsively re-laying out the slide in response to additional or changed slide content; and allowing user customization of automatically created layouts while maintaining autolayout advantages (e.g., automatic control over spacing, alignment, margins).

A slide to layout in presentation software includes a combination that can include text and one or more assets such as an image. The semantic autolayout solution determines the best layout for these combinations of content as follows:

The order in which content is added to a slide provides information for default semantic choices. If the user types text first, the slideshow presentation software program assumes that text should be prioritized on the slide. If the user adds an asset such as an image first, it is assumed that the asset should be prioritized on the slide.

Content is analyzed to determine best fit on the slide. For example, images that have a landscape orientation are flagged and layouts that place text underneath the image are prioritized. For images that are portrait, layouts with text to the right or the left of the image will be prioritized. For short amounts of text, layouts with smaller text areas are prioritized. For longer amounts of text, layouts with more of the slide devoted to the text area are prioritized, and assets may be shrunk.

A default semantic choice and set of content yields a specific layout. By using the information above, a layout that represents the user's inferred communication intent for the slide is created. The layout devotes space on the slide to text and assets according to the semantic intent and content size/orientation. This layout is automatically created for the user and requires no manual layout on their page.

Users can override defaults by specifying semantic choices. Although the slideshow presentation software program infers user intent from the content and the order it was added, the user is free at any time to specify a semantic intent by interacting with the user interface of the software. For example, a dropdown can allow the user to choose between three semantic choices: "Show" (prioritize asset content, use text as captions), "Tell" (prioritize text content, use assets as illustrations of that content), and "Intro" (increased text size to introduce a title, section or thought, style asset to support title-styled text).

Users can also customize default layout choices for a given semantic intent. Even if the slideshow presentation software program has correctly deduced the user's semantic intent, further customization of the layout is also possible in a way that continues to leverage automatic layout methods to ensure that layouts are effective and good looking. For example, if the user wants to change the order of text and asset on the slide from the asset being on the left of the text to the asset being on the right, the user can indicate this through drag and drop or choosing a layout direction option from a popover menu. However, the slideshow presentation software program still creates the final layout, ensuring that content is lined up, proportioned correctly and allowing the user to avoid having to manually layout items on the slide, which the user may not have the skill to make look professional.

Reference may be made herein to the term "slide" or "presentation slide." These terms herein refer to a visual layout of presentation elements (e.g., text and/or other digital assets) to be displayed during a slideshow presentation. It will be understood that a slideshow presentation may include one or more presentation slides. Slides and slideshows may be created, edited, and/or displayed using a slideshow presentation software program.

FIG. 1 is a flowchart illustrating a method 100 of performing semantic auto layout of a presentation slide in a slideshow presentation software program, according to some embodiments. FIGS. 2-8 are views of an example graphical user interface (GUI) 200 illustrating operations of the method 100 of FIG. 1.

Figure 2:
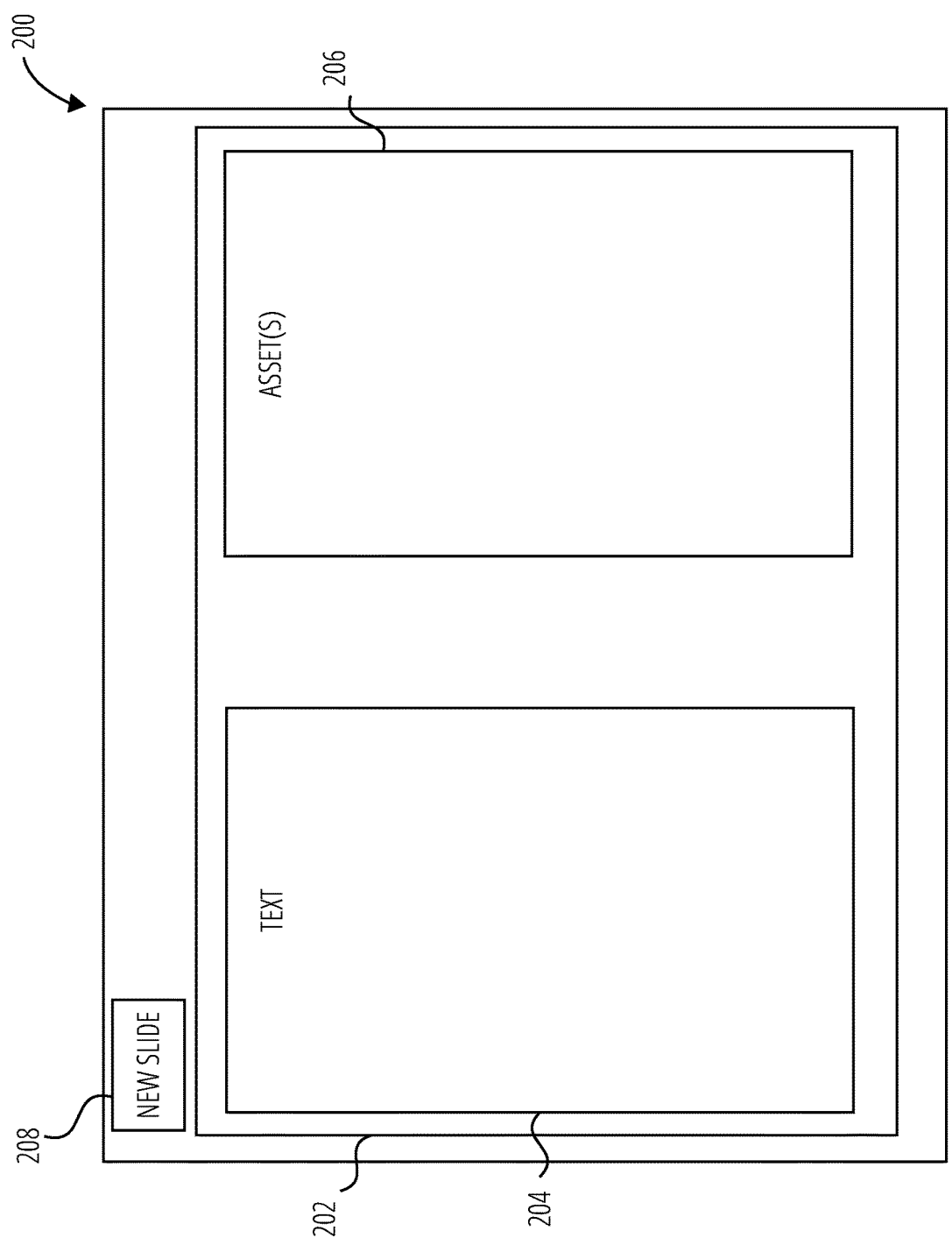
FIG. 2 is a view of an example graphical user interface (GUI) illustrating operations of the method of FIG. 1.

Referring to FIGS. 1 and 2 together, the method 100 includes creating 102 a new presentation slide 202. FIG. 2 illustrates the presentation slide 202. In some embodiments, the presentation slide 202 may be created responsive to a user of the slideshow presentation software program selecting a new slide option 208 to direct the slideshow presentation software program to create the presentation slide 202.

In some embodiments the presentation slide 202 is created 102 with a default layout. For example, the presentation slide 202 includes a text field 204 and an asset field 206 arranged according to the default layout. It should be understood that although FIG. 2 illustrates the default layout of the text field and the asset field in a particular way (e.g., the text field 204 on the left side of the presentation slide 202 and the asset field 206 on the right side of the presentation slide 202), other default layouts are contemplated. In some embodiments, the default layout may be customizable by the user.

The text field 204 is configured to receive text to be displayed in the presentation slide 202. For example, the text field 204 may be configured to receive text identifying a title of a slideshow including the presentation slide 202, a title of the presentation slide 202, a caption for an item (e.g., an image) in the asset field 206, presentation text, or any other text to be displayed by the presentation slide 202. The asset field 206 is configured to receive one or more digital assets to be displayed in the presentation slide 202. By way of non-limiting example, the digital assets may include an image, a flowchart, a graph, a video, a diagram, a chart, other digital assets, or combinations thereof.

Figure 3:
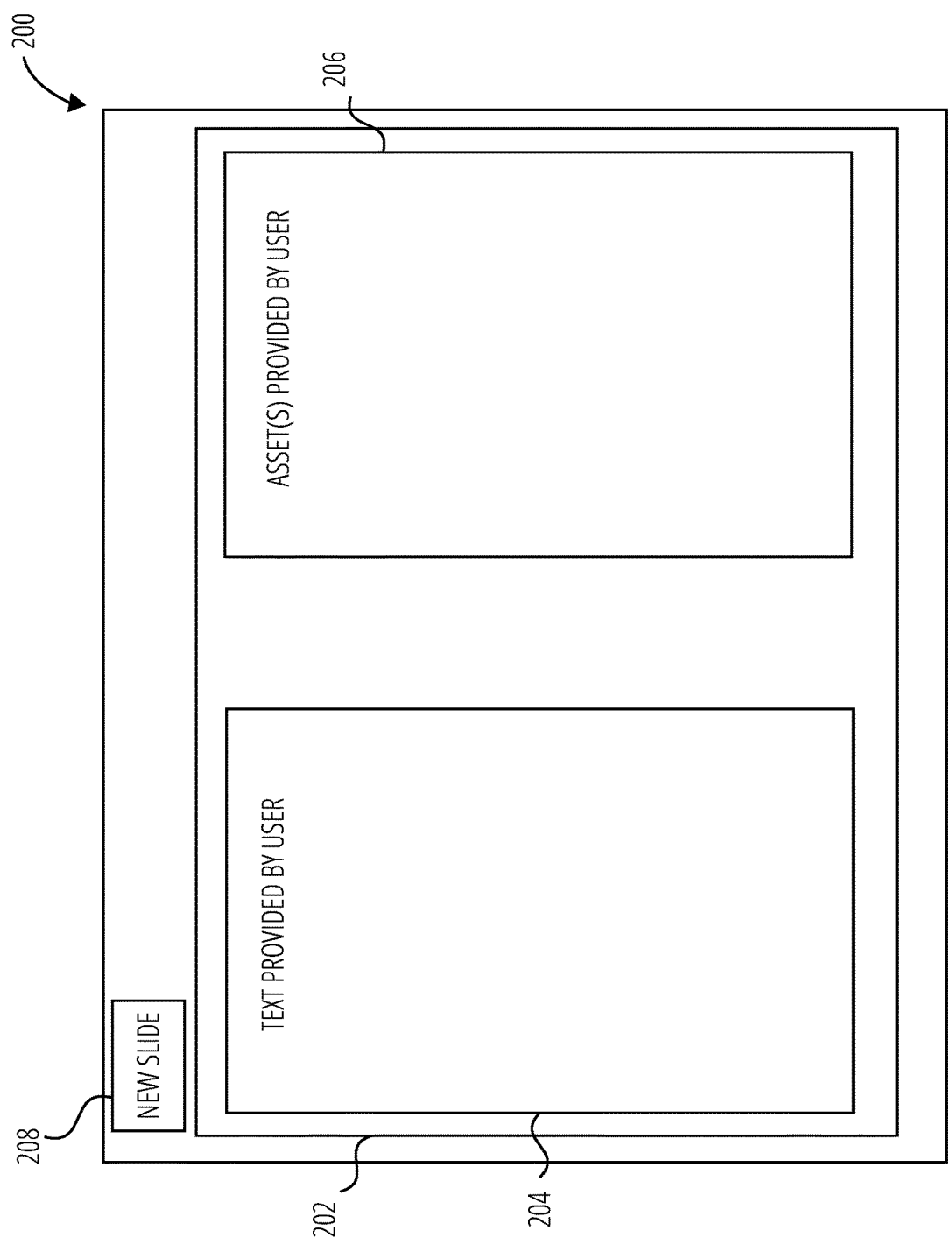
FIG. 3 is a view of an example GUI illustrating operations of the method of FIG. 1.

Referring to FIGS. 1 and 3 together, the method 100 includes receiving 104 text to be displayed in the text field 204, an asset to be displayed in the asset field 206, or both text and an asset. FIG. 3 shows text provided by the user in the text field 304, and one or more assets provided by the user in the asset field 206. Receiving 104 may including receiving the text, asset, or both from the user via user manipulation of one or more input devices 1110, as will be discussed in more detail below with reference to FIG. 11.

Figure 4:
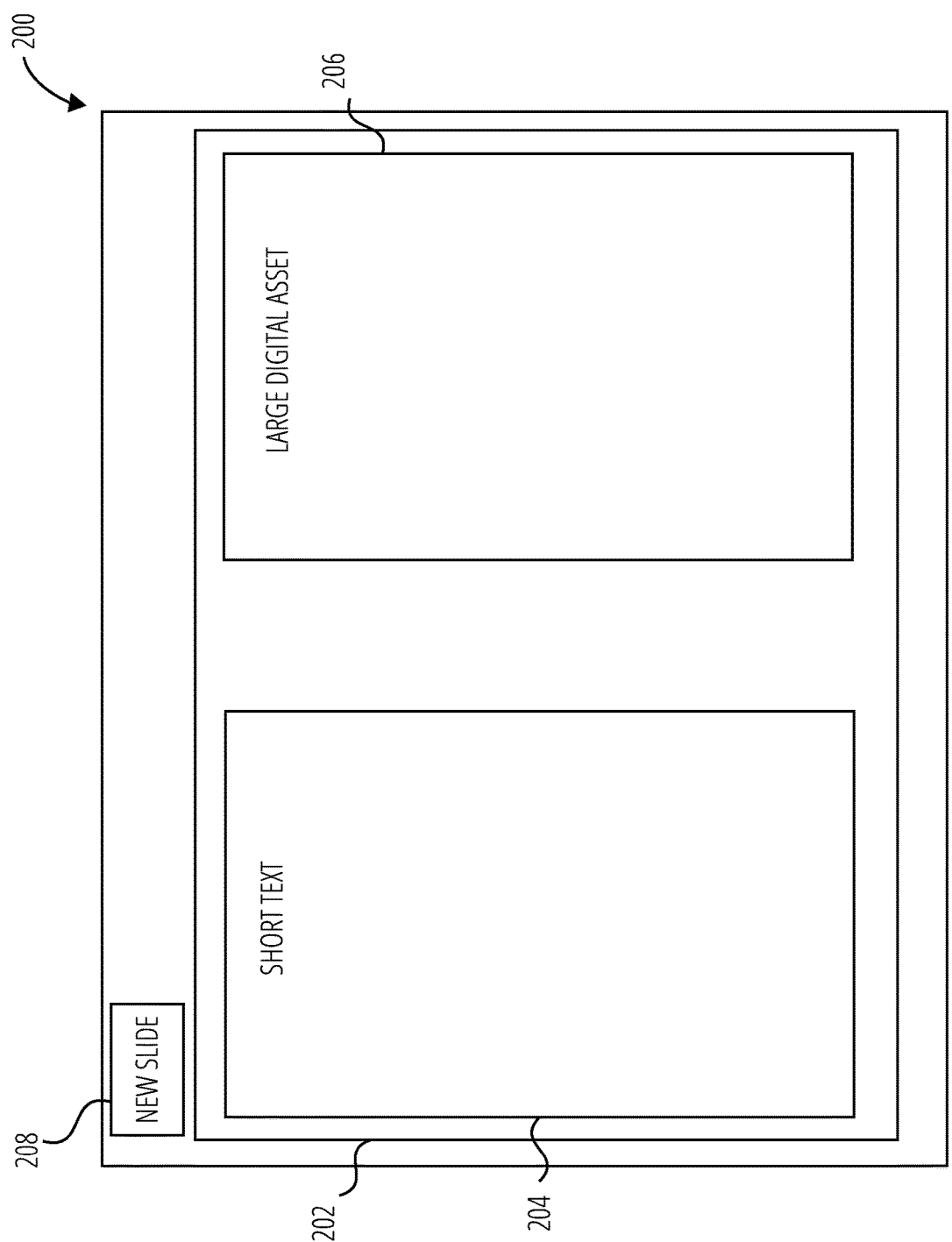
FIG. 4 is a view of an example GUI illustrating operations of the method of FIG. 1.

Referring to FIGS. 1 and 4 together, the method 100 includes analyzing 106 a semantic intent of the user to emphasize the text field 204 or the asset field 206 based on the text and/or assets received 104 from the user. In some instances, the text received from the user may be relatively short, as illustrated in the text field 204 of FIG. 4. The slideshow presentation software program may be capable of detecting the length of the text in the text field 204 and use the detected length of the text in making inferences about the intent of the user. By way of non-limiting example, the length of the text in the text field 204 may be measured based on predetermined threshold numbers of characters, words, or lines of the text, or on predetermined threshold amounts of space occupied by the text in the text field 204. Also the slideshow presentation software program may be capable of detecting properties of the one or more digital assets in the asset field 206 and make inferences about the intent of the user based on the detected properties. By way of non-limiting example, a size of the digital assets, a prominence of colors, or other properties of the digital assets in the asset field 206 may be detected and analyzed. FIG. 4 shows that the digital asset in the asset field 206 is relatively large (e.g., larger than a predetermined threshold area). It should be noted, however, that it may be preferable in some embodiments to merely resize digital assets to fit available space rather than to make determinations 108 about intent based on size of the digital assets.

The method 100 also includes automatically determining 108 the intent of the user to emphasize the text field 204 or the asset field 206 within the presentation slide 202 based on the analysis 106. For example, in FIG. 4 the text field 204 includes a relatively short amount of text and the asset field 206 includes a relatively large digital asset. As a result, the slideshow presentation software program may determine that the intent of the user is to emphasize the asset field 206.

In some embodiments, the slideshow presentation software program may determine 108 that the user intended to emphasize the text field 204 or the asset field 206 based on which of the text field 204 or the asset field 206 the user added content to first. For example, if the user added the digital asset to the asset field 206 before the user added text to the text field 204, it may be determined 108 that the user intended to emphasize the asset field.

Figure 5:
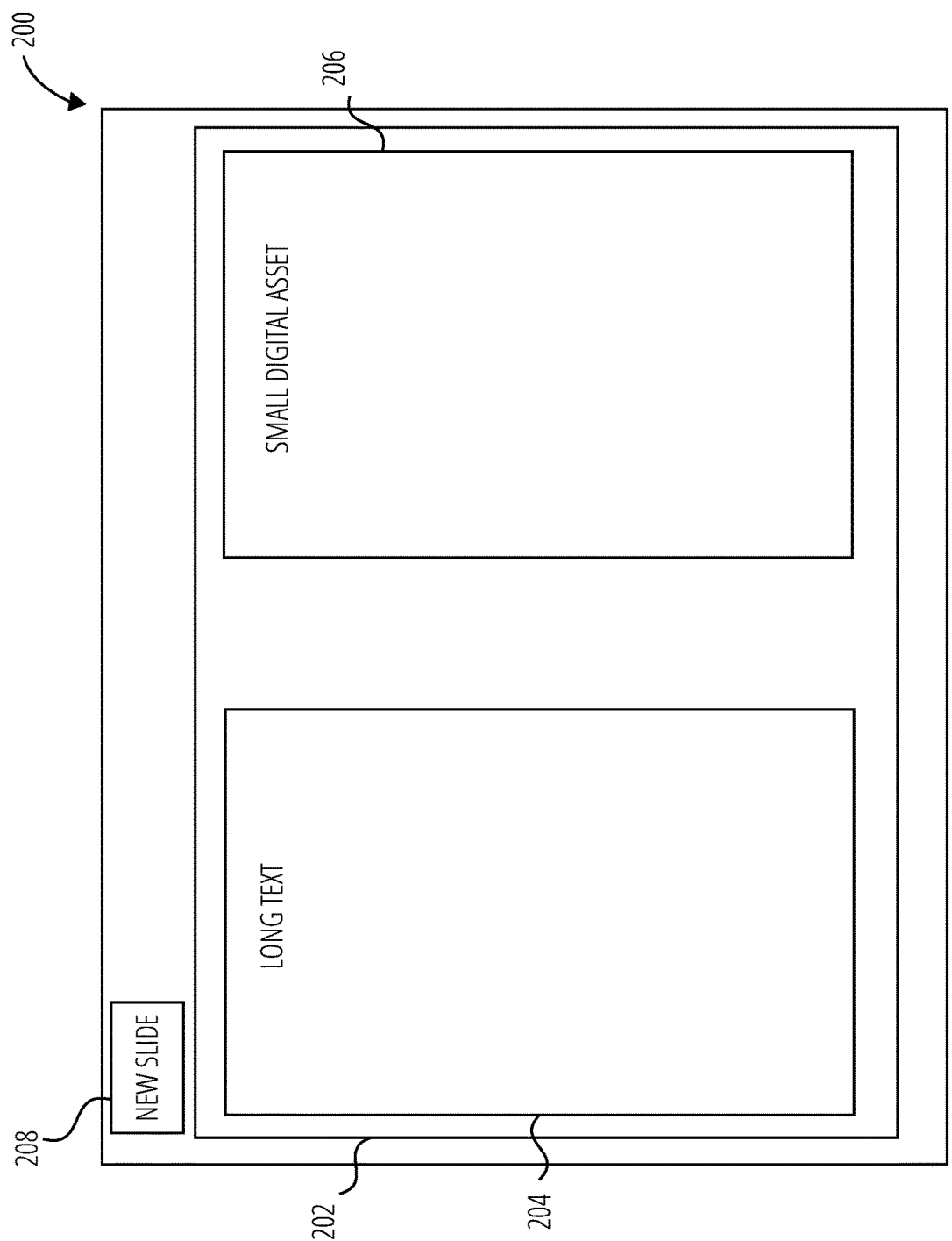
FIG. 5 is a view of an example GUI illustrating operations of the method of FIG. 1.

If the slideshow presentation software program determines 108 the intent of the user was to emphasize the asset field 206, the method 100 may include selecting 110 an asset emphasis autolayout, which may occur in the example provided in FIG. 4. If, however, it is determined 108 that the intent of the user was to emphasize the text field 204, the method 100 may include selecting 112 a text emphasis autolayout. FIG. 5 illustrates an example where the slideshow presentation software program may select 112 the text emphasis autolayout.

Referring to FIGS. 1 and 5 together, in some instances the user may provide a relatively large or long amount of text in the text field 204. FIG. 5 illustrates a relatively long amount of text in the text field 204 and a relatively small digital asset in the asset field 206. In such instances, determining 108 the intent of the user may include determining 108 that the user intended to emphasize the text field 204.

Responsive to selecting 110 the asset emphasis autolayout or selecting 112 the text emphasis autolayout, the method 100 includes further analyzing 114 which autolayout to use. In some embodiments, further analyzing 114 includes automatically selecting a flexible template layout from a plurality of predetermined flexible template layouts based on properties of the text, the digital assets, or both. As used herein, the term "flexible template layout" indicates that, although the flexible template layout may impose rules about the arrangement, size, margins, spacing, or other properties of elements displayed within the presentation slide, these rules are flexible (e.g., the size, arrangement, and other properties of the flexible template layout may be automatically modified to fit the text or digital assets received by the user for the presentation slide 202). By way of non-limiting example, a flexible template layout may be automatically selected if the length of the text in the text field 204 and the size and/or shape of the digital assets in the asset field match those of the selected template layout, subject to the determined 108 emphasis. In some embodiments, selecting a template layout includes prioritizing at least a portion of the plurality of predetermined template layouts based on features of the text in the text field 204 or the one or more digital assets in the asset field 206. In some embodiments, prioritizing at least a portion of the plurality of predetermined layouts comprises prioritizing those of the plurality of predetermined layouts that offset the text field 204 vertically from the asset field 206 (e.g., as a caption for the asset field 206) if the one or more digital assets include an image having a landscape orientation. In some embodiments, prioritizing at least a portion of the plurality of predetermined layouts comprises prioritizing those of the plurality of predetermined layouts that offset the text field 204 horizontally from the asset field 206 if the one or more digital assets include an image having a portrait orientation. In some embodiments, prioritizing at least a portion of the plurality of predetermined layouts comprises prioritizing those of the plurality of predetermined layouts that size the text field 204 appropriately to fit the text provided by the user.

In some embodiments, further analyzing 114 includes automatically rearranging placement of the text field and the asset field within the presentation slide based on properties of the text, the one or more digital assets, or both. By way of non-limiting example, the text field 204 may be automatically placed under or over the asset field 206 if the one or more digital assets include an image having a landscape orientation. Also by way of non-limiting example, the text field 204 may be placed beside (e.g., to the left or right of) the asset field 206 if the one or more digital assets include an image having a portrait orientation. In some embodiments, further analyzing 114 includes automatically resizing the text field 204, the text within the text field 204, the asset field 206, the assets within the asset field 206, or combinations thereof, based on properties of the text field. For example, the text field 204, the asset field 206, or both may be resized to fit the text and/or assets provided thereto.

Figure 6:
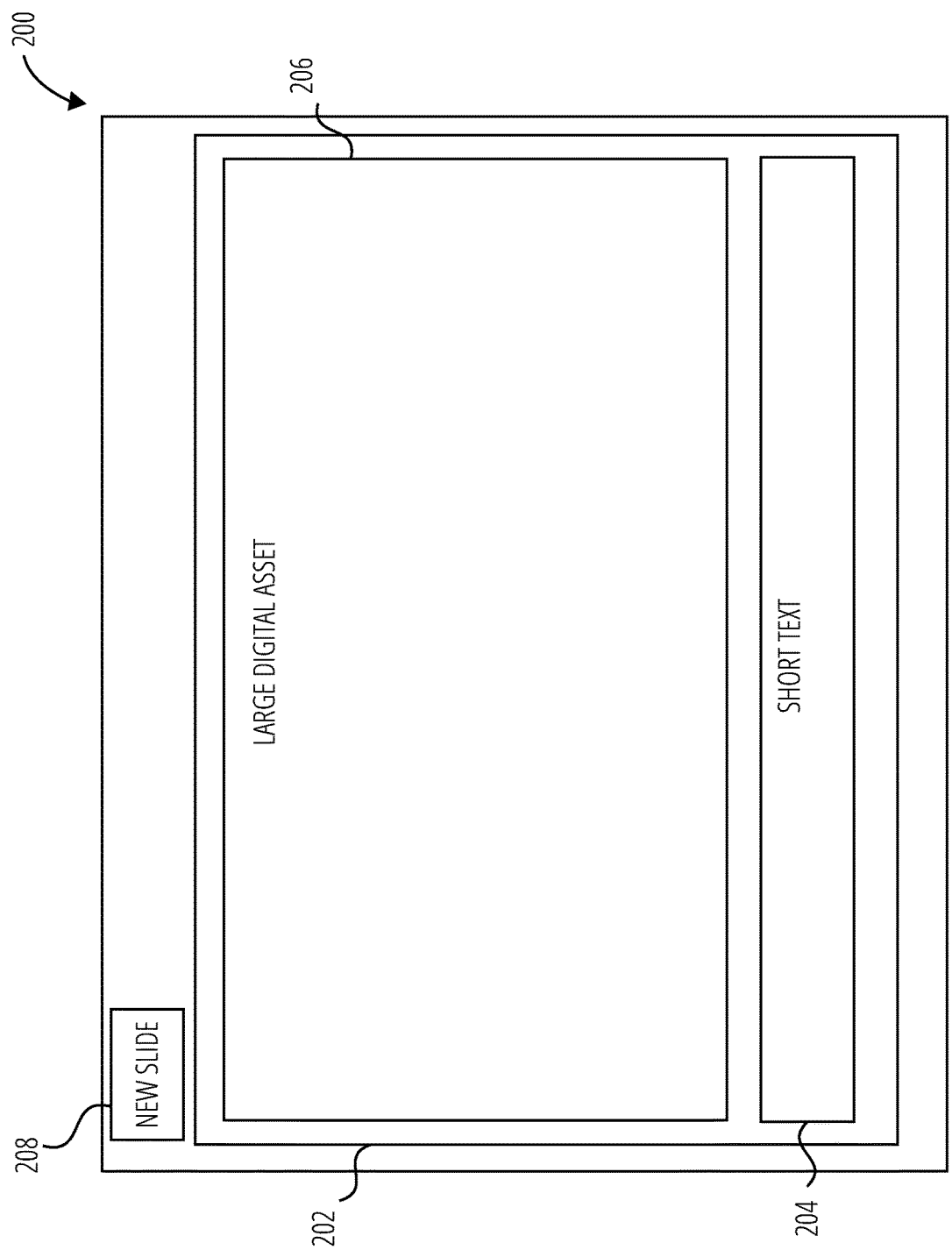
FIG. 6 is a view of an example GUI illustrating operations of the method of FIG. 1.
Figure 7:
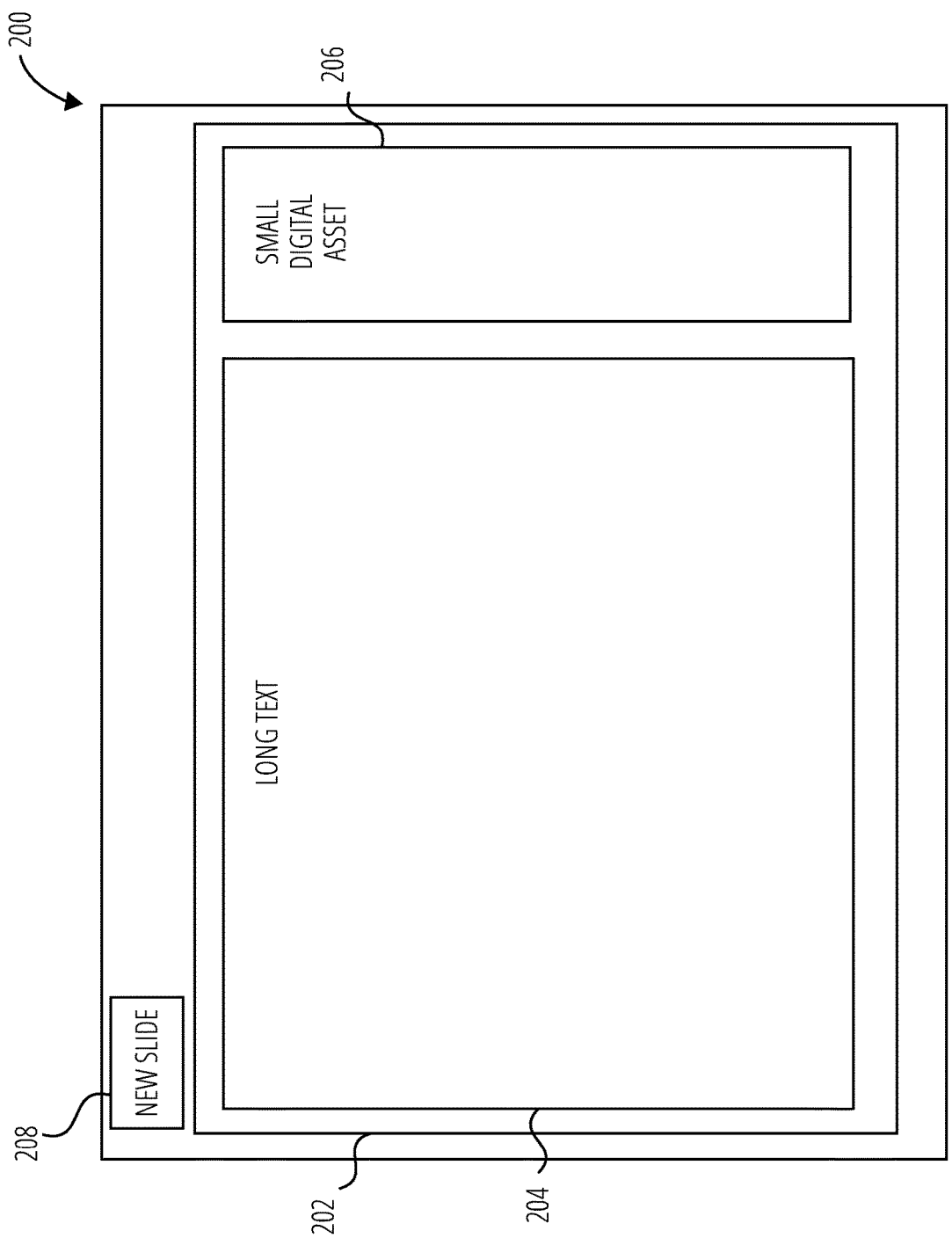
FIG. 7 is a view of an example GUI illustrating operations of the method of FIG. 1.

Referring to FIGS. 1, 6, and 7 together, the method 100 includes providing 116 an initial automatic layout based on the further analyzing 114. Examples of initial automatic layouts of the presentation slide 202 are illustrated in FIGS. 6 and 7. FIG. 6 illustrates an initial automatic layout where a relatively large digital asset was received in the asset field 206 and a relatively short amount of text was received in the text field 204. As shown in FIG. 6, the presentation slide 202 has been automatically modified to emphasize the relatively large digital asset in the asset field 206. By way of non-limiting example, the presentation slide 202 may be automatically laid out to treat the text field 204 as a caption for the digital asset in the asset field 206. Also by way of non-limiting example, the text field 204 and the asset field 206 may be automatically resized to fit the text and digital assets received. As a further non-limiting example, the text field 204 and the asset field 206 may be automatically aligned with each other (e.g., edges of the text field 204 and the asset field 206 aligned with each other). In some embodiments, one or more of the text or the digital assets may be re-sized to fit the text field 204 or the asset field 206 more tightly and take better advantage of the displayable area of the presentation slide 202.

FIG. 7 illustrates an initial automatic layout where a relatively long amount of text was received in the text field 204 and a relatively small digital asset was received in the asset field 206. As shown in FIG. 7, the presentation slide 202 has been automatically modified to emphasize the relatively long amount of text in the text field 204. As previously discussed with reference to FIG. 6, by way of non-limiting example, the text field 204 and the asset field 206 may be automatically resized to fit the text and digital assets received. As a further non-limiting example, the text field 204 and the asset field 206 may be automatically aligned with each other (e.g., edges of the text field 204 and the asset field 206 aligned with each other). In some embodiments, one or more of the text or the digital assets may be re-sized to fit the text field 204 or the asset field 206 more tightly and take better advantage of the displayable area of the presentation slide 202.

If the user makes further edits (e.g., adds, deletes, or modifies text from the text field 204 and/or digital assets from the asset field 206) to the presentation slide 202 after providing 116 the initial automatic layout, the slideshow presentation software program may repeat operations 104-106 to further modify the initial automatic layout based on the edits. By way of non-limiting example, if the user increases a size of an image in the asset field 206, the text field 204 may be automatically decreased in size to accommodate an increase in size of the asset field 206.

Figure 8:
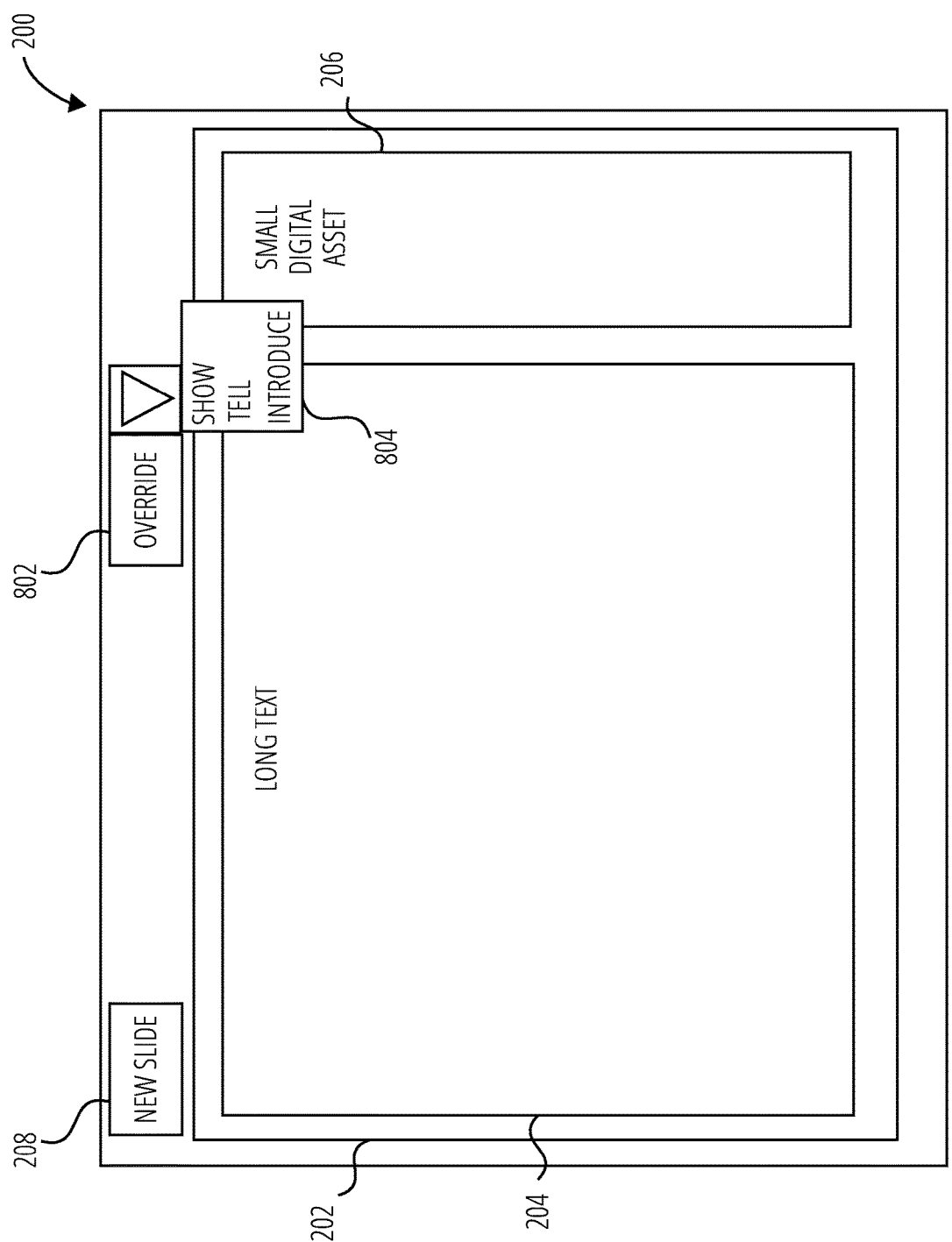
FIG. 8 is a view of an example GUI illustrating operations of the method of FIG. 1.

Referring to FIGS. 1, and 8 together, the method 100 may further include overriding 118 a user intent previously determined 108 responsive to user inputs. FIG. 8 illustrates an example of an override option 802. The override option 802 of FIG. 8 includes a dropdown menu 804 that appears responsive to a user selection of the override option 802. The dropdown menu 804 includes a "SHOW" option, a "TELL" option, and an "INTRODUCE" option. The "SHOW" option, when selected by the user, instructs the slideshow presentation software program to select 124 the emphasis of the presentation slide 202 to be an asset emphasis of the one or more digital assets in the asset field 206, regardless of the determined 108 intent. The "TELL" option, when selected by the user, instructs the slideshow presentation software program to select 120 the emphasis of the presentation slide 202 to be a text emphasis of the text in the text field 204, regardless of the determined 108 intent. The "INTRODUCE" option, when selected by the user, instructs the slideshow presentation software program to select 122 the emphasis of the presentation slide 202 to be a title or introduction (transforming the presentation slide 202 into a title or introduction slide).

Figure 9:
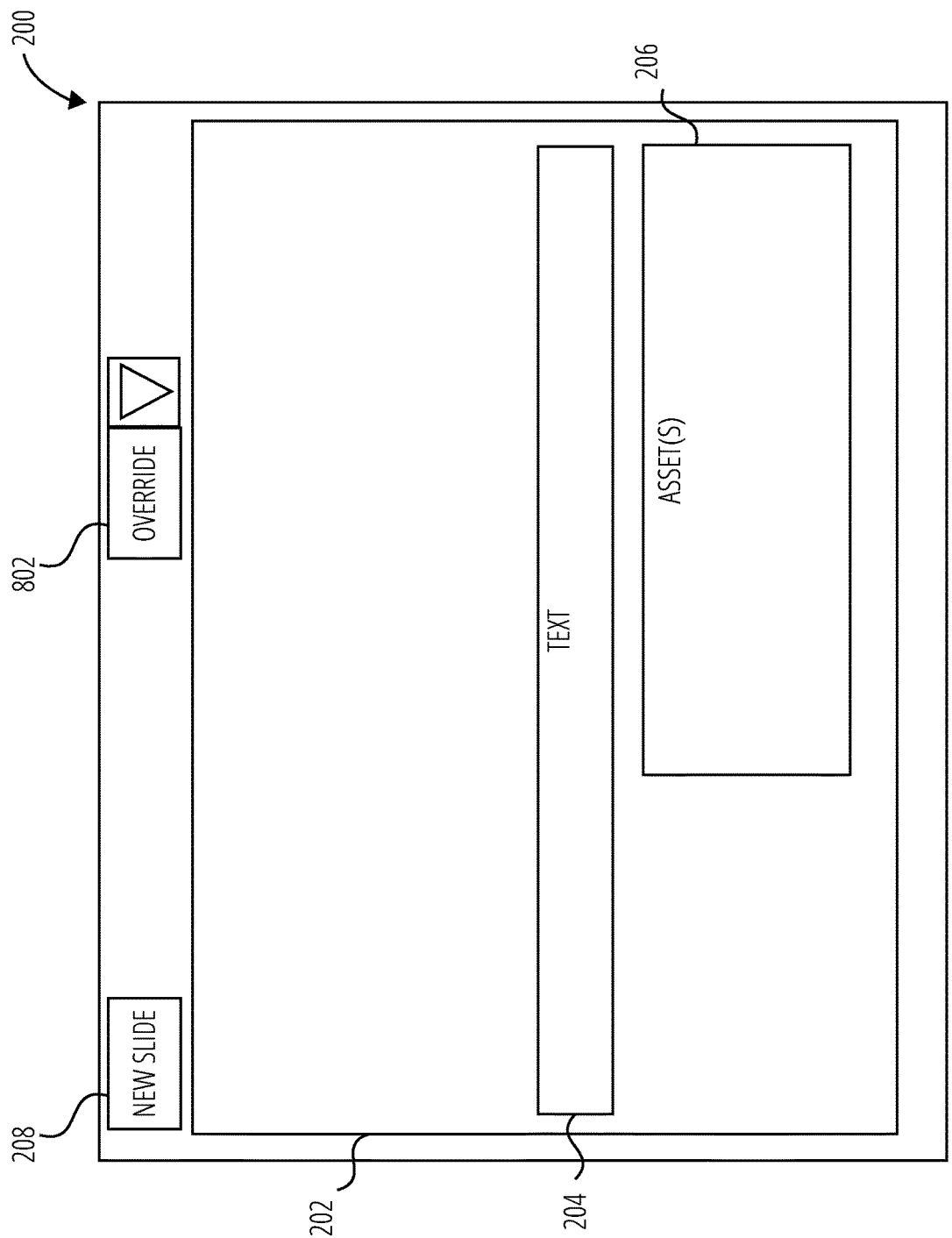
FIG. 9 is a view of an example GUI illustrating operations of the method of FIG. 1.

Referring to FIGS. 1 and 9 together, FIG. 9 illustrates an example of changes that may be automatically made to a presentation slide 202 responsive to receiving a selection, by the user, of the "INTRODUCE" option from the dropdown menu 804. As illustrated in FIG. 9, the text field 204 and the asset field 206 may be rearranged, resized, and/or reformatted according to a title or introduction autolayout configuration (e.g., the text field 204 extending horizontally across the presentation slide 202 just below a center of the presentation slide 202).

Responsive to a selection 120, 122, 124 resulting from an override 118 (e.g., using the override option 802), the method 100 includes customizing 126 the presentation slide 202 responsive to user-received manual customizations to the text in the text field 204, the assets in the asset field 206, or both. For example, the slideshow presentation software program may be configured to enable the user to manually rearrange the presentation slide 202 while automatically maintaining predetermined spacing, margins, alignment, or combinations thereof. By way of non-limiting example, the slideshow presentation software program may enable the user to change a positions of the text field 204 and/or the asset field 206, change a size or an orientation of an asset in the asset field 206, change a position of the text within the text field 204, change the size, font, or ratio of the text or asset in the text field 204 and/or asset field 206, other changes, or combinations thereof. Again, predetermined spacing, margins, alignments, and other properties may be automatically maintained.

Even if the slideshow presentation software program has correctly deduced the user's semantic intent, further customization of the layout is also possible in a way that continues to leverage automatic layout methods to ensure that layouts are effective and good looking. For example, if the user wants to change the order of text and asset on the slide from the asset being on the left of the text to the asset being on the right, the user can indicate this through drag and drop or choosing a layout direction option from a popover menu. However, the slideshow presentation software program still creates the final layout, ensuring that content is lined up, proportioned correctly and allowing the user to avoid having to manually layout items on the slide, which the user may not have the skill to make look professional.

The method 100 further includes providing 128 a final layout of the presentation slide 202. The final layout may include automatic adjustments made by the slideshow presentation software program, manual adjustments/customizations made by the user, or combinations thereof.

In some embodiments, the slideshow presentation software program may be capable of adapting the presentation slide 202 for display on digital displays of different shapes, sizes, orientations, and/or resolutions. For example, if the presentation slide 202 is created and designed to be presented on a large landscape-oriented electronic display, the presentation slide 202 may not present as well electronic displays of other sizes or orientations. By way of non-limiting example, the entire presentation slide 202 may be shrunk to a fraction of the size of a large portrait-oriented electronic display to display the presentation slide 202 across the electronic display, wasting available and potentially useful display area. Also by way of non-limiting example, the text of the presentation slide 202 may be too small to read if viewed on a small, landscape orientation electronic display. Accordingly, the slideshow presentation software program may be configured to resize and/or rearrange content of the presentation slide 202 if presented on an electronic display that is different from the electronic display for which it was originally designed. This may be accomplished using template autolayout slides.

Figure 10:
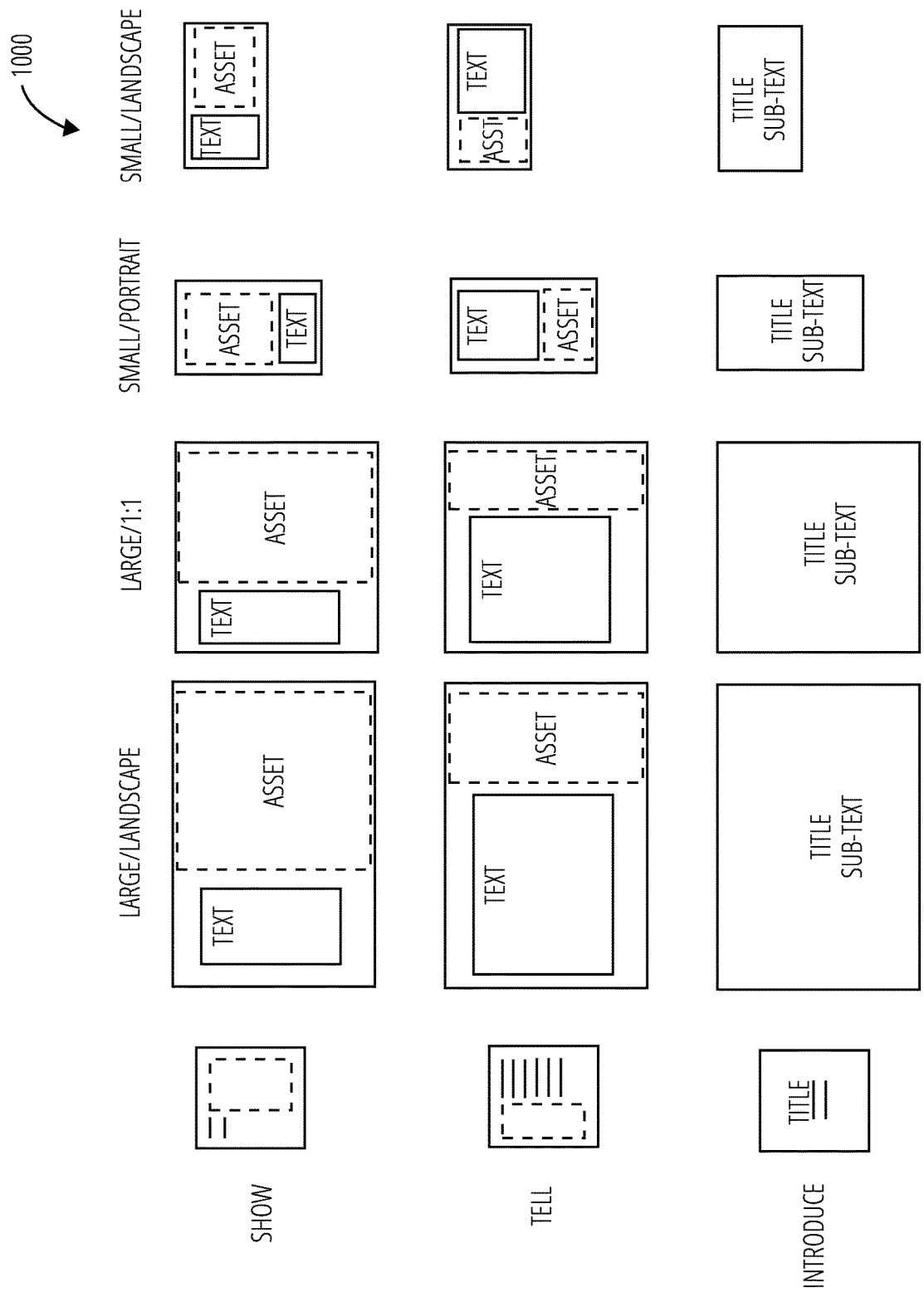
FIG. 10 illustrates examples of flexible template autolayout slides 1000 that may be used to resize and/or rearrange content of the presentation slide 202 for various sizes and orientations of electronic displays based on the detected/selected semantic intent.

FIG. 10 illustrates examples of flexible template autolayout slides 1000 that may be used to resize and/or rearrange content of the presentation slide 202 for various sizes and orientations of electronic displays based on the detected/selected semantic intent. The template autolayout slides 1000 are separated into semantic intent categories based on a "SHOW" (digital asset emphasizing) category, a "TELL" (text emphasizing) category, and an "INTRODUCE" (title or introduction emphasizing) category, which correspond to the detected or user-specified emphases discussed above with reference to FIG. 1. The template autolayout slides 1000 are also separated into size/orientation categories based on a size/orientation of the electronic display. The size/orientation categories illustrated in FIG. 10 include a "LARGE/LANDSCAPE" category, a "LARGE/1:1" category (1:1 corresponding to a 1:1 aspect ratio), a "SMALL/PORTRAIT" category, and a "SMALL/LANDSCAPE" category. The template autolayout slides 1000 of FIG. 10 are illustrated in a table format with the semantic intent categories spaces vertically and the size/orientation categories spaced horizontally. At the intersection between each of the semantic intent categories and the size/orientation categories, FIG. 10 illustrates an example template autolayout slide corresponding to the specific semantic intent category and size/orientation category in line therewith. FIG. 10 illustrates a text field TEXT, an asset field ASSET or ASST, a title field with sub text TITLE, SUB-TEXT or combinations thereof within each of the template autolayout slides 1000 that is appropriate for the semantic intent category and size/orientation category that correspond thereto.

When the slideshow presentation software program displays a presentation slide associated with one of the semantic intent categories, the slideshow presentation software program may select one of the template autolayout slides 1000 based on the semantic intent category and the size/orientation category that best corresponds to a detected or user-indicated screen that is in use. In this way, the slideshow presentation software program may present each presentation slide of a slideshow presentation on the electronic display in a manner that is appropriate for the semantic intent of each slide and for the size and orientation of the electronic display.

Figure 11:
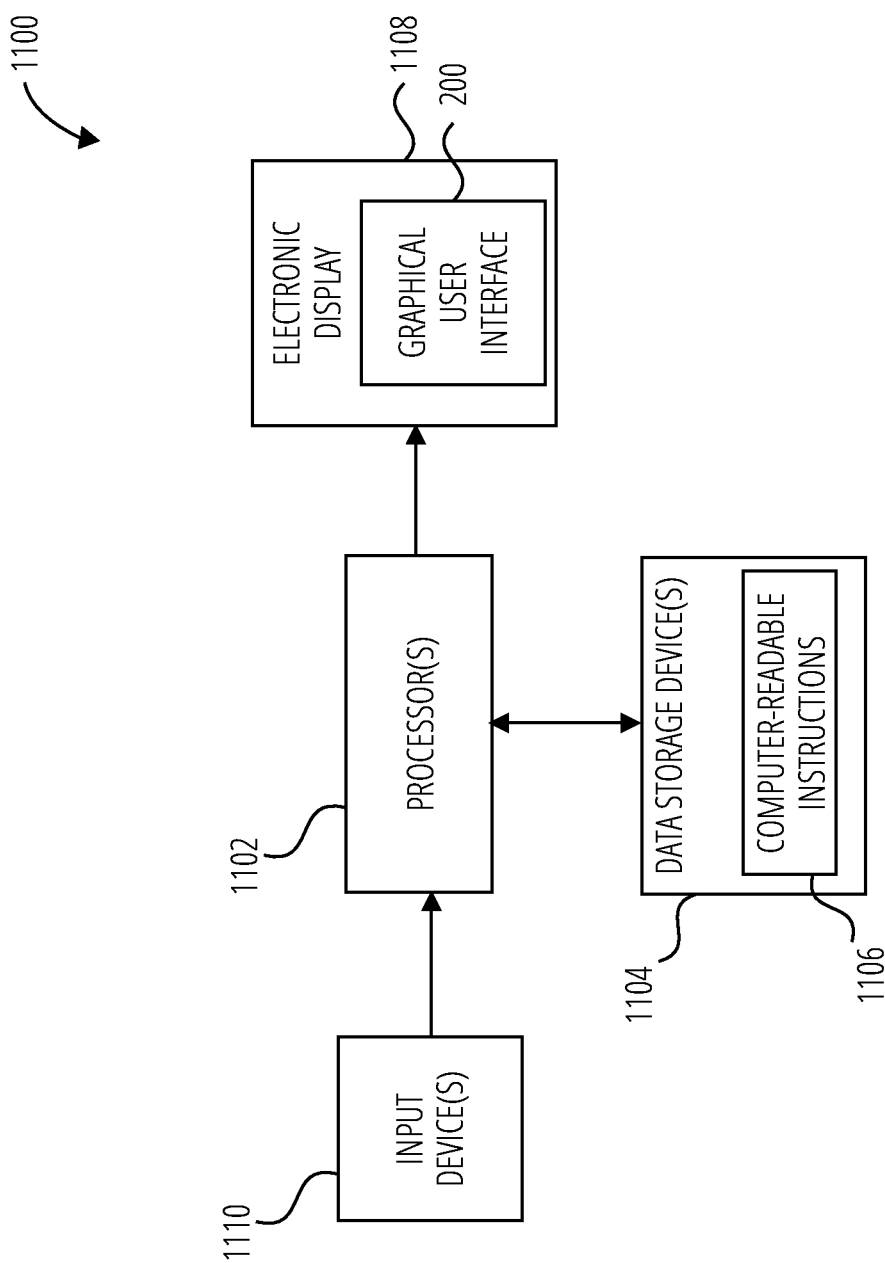
FIG. 11 is a block diagram of a computing device that may be used to execute slideshow presentation software programs in accordance with some embodiments.

FIG. 11 is a block diagram of a computing device 1100 that may be used to execute slideshow presentation software programs in accordance with some embodiments. The slideshow presentation software program may be configured to instruct the computing device 1100 to implement embodiments of the disclosure. For example, the computing device 1100 may include one or more processors 1102 operably coupled to one or more data storage devices 1104. The one or more processors 1102 may include a central processing unit (CPU) of a computer (e.g., a desktop computer, a laptop computer, a tablet computer, a smartphone, etc.), a microcontroller, a field programmable gate array (FPGA), a programmable logic controller (PLC), an application specific integrated circuit (ASIC), other processors, or combinations thereof. The one or more data storage devices 1104 may include volatile data storage (e.g., random access memory, or RAM), non-volatile data storage (e.g., a hard drive, a solid state drive, a Flash drive, etc.) other data storage device, or combinations thereof.

The one or more data storage devices 1104 include computer-readable instructions 1106 stored thereon. The computer-readable instructions 1106 implement functions of the slideshow presentation software program. As a result, the computer-readable instructions 1106 may be configured to instruct the one or more processors 1102 to perform operations and functions discussed herein. By way of non-limiting example, the computer-readable instructions 1106 may be configured to instruct the one or more processors 1102 to perform at least a portion of the method 100 of FIG. 1. Also by way of non-limiting example, the computer-readable instructions 1106 may be configured to instruct the one or more processors 1102 to display a presentation slide 202 (FIGS. 2-9) using a GUI 200 (FIGS. 2-9) displayed on a screen of an electronic display 1108.

The computing device 1100 also includes one or more input devices 1110 configured to receive user inputs for use in the slideshow presentation software program. For example, the one or more input devices 1110 may include a keyboard, a mouse, a keypad, a trackpad, a touch-screen sensor, a microphone, a button or buttons, a motion sensor, a camera, other input devices, or combinations thereof.

Figure 12:
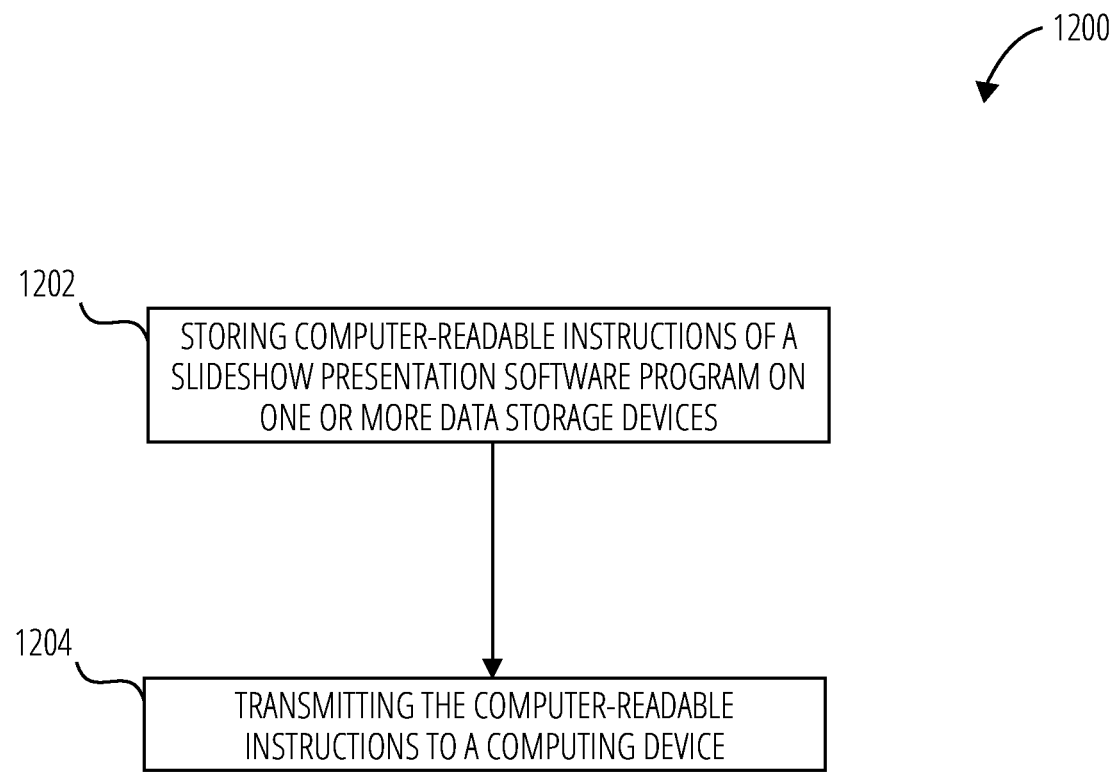
FIG. 12 is a flowchart illustrating a method of transforming a computing device into an autolayout slideshow editor, according to some embodiments.

FIG. 12 is a flowchart illustrating a method 1200 of transforming a computing device into an autolayout slideshow editor, according to some embodiments.

FIG. 13 is a block diagram of a software distribution system 1300, according to some embodiments. Referring to FIGS. 12 and 13 together, the software distribution system 1300 includes one or more software distribution devices 1302 and a computing device 1100 to be transformed into an autolayout slideshow editor, according to embodiments disclosed herein. The one or more software distribution devices 1302 includes one or more data storage devices 1304. The computing device 1100 includes the one or more processors 1102 and the one or more data storage devices 1104 discussed above with reference to FIG. 11.

The method 1200 includes storing 1202 computer-readable instructions 1106 of a slideshow presentation software program on the one or more data storage devices 1304 of the one or more software distribution devices 1302. As discussed above, the computer-readable instructions 1106 are instructions for a slideshow presentation software program, according to embodiments disclosed herein. The computer-readable instructions 1106 are configured to instruct the one or more processors 1102 of the computing device 1100 to display a GUI 200 of the autolayout slideshow editor on an electronic display 1108 (FIG. 11), and display a presentation slide 202 (FIGS. 2-9) within the GUI 200. The presentation slide 202 includes a text field 204 (FIGS. 2-9) and an asset field 206 (FIGS. 2-9) arranged according to a default layout.

The text field 204 is configured to receive text to be displayed by the presentation slide 202 and the asset field 206 is configured to receive one or more digital assets to be displayed in the asset field 206. The computer-readable instructions 1106 are also configured to instruct the one or more processors 1102 of the computing device 1100 to automatically determine an intent to emphasize the text or the one or more digital assets within the presentation slide 202 based on the text, the one or more digital assets, or both. The computer-readable instructions 1106 are further configured to instruct the one or more processors 1102 of the computing device 1100 to automatically modify the presentation slide to conform to a modified layout. The modified layout is selected based on the determined intent to emphasize the text or the one or more digital assets.

The method 1200 also includes transmitting 1204 the computer-readable instructions 1106 to the computing device 1100. When the computing device 1100 receives and stores the computer-readable instructions 1106 on the one or more data storage devices 1104 for execution by the one or more processors 1102, the computing device 1100 is transformed into an autolayout slideshow editor according to embodiments disclosed herein.

In some embodiments, the one or more software distribution devices 1302 include one or more software distribution servers configured to distribute the computer-readable instructions 1106 over one or more networks (e.g., the internet) to the computing device 1100. By way of non-limiting example, the one or more software distribution devices 1302 may include a server of a software store such as an application store, or "app store." Also by way of non-limiting example, the one or more software distribution devices 1302 may include a mobile application store.

In some embodiments, the one or more software distribution devices 1302 include a portable device capable of storing the computer-readable instructions 1106 and itself being distributed (e.g., shipped) to a location of the computing device 1100. By way of non-limiting example, the one or more software distribution devices 1302 may include a computer-readable disc (e.g., a digital versatile disc (DVD), a compact disc (CD), a magnetic disc, a Flash drive, other portable data storage device, or combinations thereof) configured to interface directly with the computing device 1100 (e.g., by plugging into the computing device 1100 or communicating with the computing device 1100 via a personal area network (PAN) such as Bluetooth) to transmit 1204 the computer-readable instructions 1106 to the computing device 1100.

It will be apparent to those having skill in the art that many changes may be made to the details of the above-described embodiments without departing from the underlying principles of the disclosure. The scope of the present disclosure should, therefore, be determined only by the following claims.

What is claimed is:

1. A non-transitory computer-readable storage medium having computer-readable instructions stored thereon, the computer-readable instructions configured to instruct one or more processors to:

display a graphical user interface (GUI) of a slideshow presentation software program on an electronic display;

display a default layout of a presentation slide within the GUI, the default layout including a text field and an asset field, the text field to receive text to be displayed in the presentation slide, the asset field to receive one or more digital assets to be displayed in the presentation slide;

receive input provided by a user to the text field, the asset field, or both;

automatically determine an intent to emphasize the text or the one or more digital assets within the presentation slide, wherein the intent to emphasize the text instead of the one or more digital assets is determined when an amount of the text provided by the user exceeds a predetermined threshold amount of text and when a size of the one or more digital assets does not exceed a predetermined digital asset threshold, wherein the predetermined threshold amount of text includes a predetermined number of characters or a predetermined number of words; and automatically reformat the presentation slide displayed within the GUI to emphasize the text or the one or more digital assets based on the determined intent, wherein reformatting the presentation slide comprises:

selecting a modified layout based on the determined intent; and changing the presentation slide from the default layout to the modified layout, wherein if the amount of the text exceeds the predetermined threshold amount of text, the modified layout increases a size of the text field and decreases a size of the asset field.

2. The non-transitory computer-readable storage medium of claim 1, wherein the one or more digital assets include an image.

3. The non-transitory computer-readable storage medium of claim 1, wherein the intent to emphasize the text is also determined when the user provides input to the text field before providing input to the asset field.

4. The non-transitory computer-readable storage medium of claim 1, wherein the computer-readable instructions are configured to instruct the one or more processors to automatically determine to emphasize the one or more digital assets if the user provides input to the asset field before providing input to the text field.

5. The non-transitory computer-readable storage medium of claim 1, wherein the computer-readable instructions are configured to instruct the one or more processors to enable the user to manually change positions of the text field and the asset field, a size of a digital asset in the asset field, a position of the asset in the asset field, a position of the text within the text field, a size of the text within the text field, a font of the text within the text field, or a ratio of the text or the digital asset while automatically maintaining predetermined spacing, margins, alignment, or combinations thereof.

6. The non-transitory computer-readable storage medium of claim 1, wherein the computer-readable instructions are further configured to instruct the one or more processors to automatically rearrange placement of the text field and the asset field within the presentation slide based on properties of the text, the one or more digital assets, or both.

7. The non-transitory computer-readable storage medium of claim 6, wherein the computer-readable instructions are further configured to instruct the one or more processors to automatically rearrange the text field to be placed under the asset field if the one or more digital assets comprise an image having a landscape orientation.

8. The non-transitory computer-readable storage medium of claim 6, wherein the computer-readable instructions are further configured to instruct the one or more processors to automatically rearrange the text field to be placed beside the asset field if the one or more digital assets comprise an image having a portrait orientation.

9. The non-transitory computer-readable storage medium of claim 6, wherein the computer-readable instructions are further configured to instruct the one or more processors to automatically shrink the one or more digital assets if needed to accommodate a large amount of the text received from the user.

10. The non-transitory computer-readable storage medium of claim 1, wherein the computer-readable instructions are further configured to instruct the one or more processors to enable the user to override the determined intent to emphasize the text or the one or more digital assets, and automatically reformat the presentation slide displayed within the GUI to emphasize the text or the one or more digital assets based on a user-specified intent.

11. The non-transitory computer-readable storage medium of claim 10, wherein the computer-readable instructions are further configured to instruct the one or more processors to provide a dropdown menu within the GUI, the dropdown menu including user-selectable options to enable the user to specify an intent to emphasize the one or more digital assets, specify an intent to emphasize the text, and specify an intent to use the presentation slide as a title or introduction slide.

12. A method of operating a slideshow presentation software program, the method comprising:

displaying a presentation slide of a slideshow presentation with a default layout in a graphical user interface (GUI) displayed by an electronic display;

displaying a text field within the presentation slide according to the default layout, the text field to receive and display text provided by a user;

displaying an asset field within the presentation slide according to the default layout, the asset field to receive and display one or more digital assets provided by the user;

arranging the text field and the asset field in the default layout within the presentation slide;

automatically determining an intent to emphasize the text or the one or more digital assets within the presentation slide, wherein automatically determining the intent to emphasize comprises:

determining an order in which the text and the one or more digital assets are added by the user to the presentation slide, when an amount of text provided by the user exceeds a predetermined threshold, or a combination thereof, wherein if the user provides input to the asset field before providing input to the text field the automatically determined intent is to emphasize the one or more digital assets instead of the text, and wherein if the user provides input to the text field before providing input to the asset field the automatically determined intent is to emphasize the text instead of the one or more digital assets, and wherein the intent to emphasize the text instead of the one or more digital assets is determined when the amount of the text provided by the user exceeds the predetermined threshold amount of text and when a size of the one or more digital assets does not exceed a predetermined digital asset threshold; and automatically modifying the default layout of the presentation slide based on the automatically determined intent, wherein automatically modifying a layout of the presentation slide comprises:

automatically selecting a flexible template layout from a plurality of predetermined flexible template layouts based on the text provided by the user, the one or more digital assets provided by the user, or both, and modifying the presentation slide according to the selected flexible template layout to change the presentation slide from the default layout to the flexible template layout, wherein if the intent is determined to emphasize the text, the flexible template layout increases a size of the text field and decreases a size of the asset field, and wherein if the intent is determined to emphasize the one or more digital assets, the flexible template decreases the size of the text field and increases the size of the asset field.

13. The method of claim 12, wherein selecting a flexible template layout from a plurality of predetermined flexible template layouts comprises prioritizing at least a portion of the plurality of predetermined flexible template layouts based on features of the text or the one or more digital assets provided by the user.

14. The method of claim 13, wherein prioritizing at least a portion of the plurality of predetermined flexible template layouts comprises prioritizing those of the plurality of predetermined flexible template layouts that offset the text field vertically from the asset field if the one or more digital assets include an image having a landscape orientation.

15. The method of claim 13, wherein prioritizing at least a portion of the plurality of predetermined flexible template layouts comprises prioritizing those of the plurality of predetermined flexible template layouts that offset the text field horizontally from the asset field if the one or more digital assets include an image having a portrait orientation.

16. The method of claim 13, wherein prioritizing at least a portion of the plurality of predetermined flexible template layouts comprises prioritizing those of the plurality of predetermined flexible template layouts that size the text field appropriately to fit the text provided by the user.

17. A method of transforming a computing device into an autolayout slideshow editor, the method comprising:

storing, in a data storage device, computer-readable instructions configured to instruct one or more processors of the computing device to:

display a graphical user interface (GUI) of the autolayout slideshow editor on an electronic display;

display a presentation slide including a text field and an asset field according to a default layout within the GUI, the text field to receive text to be displayed by the presentation slide, the asset field to receive one or more digital assets to be displayed by the presentation slide;

automatically determine an intent to emphasize the text or the one or more digital assets within the presentation slide based on an order in which the text and the one or more digital assets are added by the user to the presentation slide, when an amount of the text provided by the user exceeds a predetermined threshold, or a combination thereof, wherein the intent to emphasize the text instead of the one or more digital assets is determined when the amount of the text provided by the user exceeds the predetermined threshold amount of text and when a size of the one or more digital assets does not exceed a predetermined digital asset threshold; and automatically modify the presentation slide to conform to a modified layout such that the presentation slide is changed from the default layout to the modified layout, the modified layout selected based on the determined intent to emphasize the text or the one or more digital assets, wherein if the intent is determined to emphasize the text instead of the one or more digital assets, the modified template layout increases a size of the text field and decreases a size of the asset field, and wherein if the intent is determined to emphasize the one or more digital assets instead of the text, the modified template decreases the size of the text field and increases the size of the asset field; and transmitting the computer-readable instructions to the computing device.

\* \* \* \* \*